(12) United States Patent
Szkudlarek et al.

(10) Patent No.: US 8,598,293 B2
(45) Date of Patent: Dec. 3, 2013

(54) VINYL ESTER RESIN COMPOSITION

(75) Inventors: Marian Henryk Szkudlarek, Nordhom (DE); Johan Franz Gradius Antonius Jansen, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/255,917

(22) PCT Filed: Mar. 24, 2010

(86) PCT No.: PCT/EP2010/053808
§ 371 (c)(1),
(2), (4) Date: Jan. 28, 2012

(87) PCT Pub. No.: WO2010/108939
PCT Pub. Date: Sep. 30, 2010

(65) Prior Publication Data
US 2012/0116025 A1    May 10, 2012

(30) Foreign Application Priority Data
Mar. 25, 2009 (EP) ..................................... 09156128

(51) Int. Cl.
*C08F 22/10* (2006.01)
*C08F 291/10* (2006.01)
*C08F 18/04* (2006.01)

(52) U.S. Cl.
USPC ......................................... 526/321; 526/313

(58) Field of Classification Search
USPC .................................................. 526/313, 321
See application file for complete search history.

(56) References Cited

U.S. PATENT DOCUMENTS 3,899,611 A * 8/1975 Hall .............................. 427/488
5,804,671 A * 9/1998 Dones et al. .................. 525/423
2005/0154114 A1 7/2005 Hale

FOREIGN PATENT DOCUMENTS

| EP | 0 436 178 | 7/1991 |
|----|-----------|--------|
| EP | 1 048 287 | 11/2000 |
| EP | 1 371 694 | 12/2003 |
| WO | WO 2006/063224 | 6/2006 |

OTHER PUBLICATIONS

International Search Report for PCT/EP2010/053808, mailed May 17, 2010.
Written Opinion for PCT/EP2010/053808, mailed May 17, 2010.

* cited by examiner

*Primary Examiner* — Ling Choi
*Assistant Examiner* — David L Miller
(74) *Attorney, Agent, or Firm* — Nixon & Vanderhye P.C.

(57) ABSTRACT

The present invention relates to a resin composition comprising (a) from 30 to 70 wt. % of a vinyl ester resin, (b) from 30 to 70 wt. % of reactive diluent, wherein the resin composition comprises methacrylate containing compound and an itaconate ester as reactive diluent.

17 Claims, No Drawings

VINYL ESTER RESIN COMPOSITION

This application is the U.S. national phase of International Application No. PCT/EP2010/053808 filed 24 Mar. 2010 which designated the U.S. and claims priority to EP Patent Application No. 09156128.2 filed 25 Mar. 2009, the entire contents of each of which are hereby incorporated by reference.

The present invention relates to a resin composition comprising (a) from 30 to 70 wt. % of a vinyl ester resin and (b) from 30 to 70 wt. % of reactive diluent.

Such a resin composition containing methacrylate containing compound as reactive diluent is for example described in WO-A-2008/077586. WO-A-2008/077586 describes that such resin compositions can suitable be applied in relining. In view of handling properties of the resin composition, it is desired that the viscosity of the resin composition is not too high. For example relining encompasses impregnating of fiber with resin composition. Therefore, viscosity of the resin composition may not be too high in view of handling and time for impregnation. This fact that viscosity is very important also holds for many other applications such as chemical anchoring, injection, vacuum injection but also the simple laminating processes like open mould applications run much smoother with lower viscosity resins. Consequently there is a large need for methods to reduce the viscosity of the resin composition. One way to lower the viscosity is by adding more reactive diluent, however, due to the lower content of resin in the resin composition, this results generally in deterioration of the mechanical properties of the cured resin composition.

The object of the present invention is obtaining a resin composition with a reduced viscosity, while mechanical properties of the cured objects are retained or even more improved, as indicated by for example tensile strength, tensile modulus, flexural strength and/or flexural modulus.

It has surprisingly been found that this can be achieved by replacing part of the methacylate reactive diluent with an ester of itaconic acid as reactive diluent. Accordingly, the resin composition according to the invention comprises methacrylate containing compound and an ester of itaconic acid as reactive diluent.

An additional surprising advantage is that the elongation at break of the cured object may also be improved.

The composition according to the invention comprises from 30 to 70 wt. % of at least one vinyl ester resin As used herein, all amounts in wt. % are given relative to the total weight of the vinyl ester resin(s) (a) and reactive diluents (b), unless otherwise specified. The vinyl ester resin as is comprised in the vinyl ester resin composition according to the invention may suitably be selected from the vinyl ester resins as are known to the skilled man. Vinyl ester resins are mostly used because of their hydrolytic resistance and excellent mechanical properties. Vinyl ester resins having unsaturated sites only in the terminal position are for example prepared by reaction of epoxy oligomers or polymers (e.g. diglycidyl ether of bisphenol-A, epoxies of the phenol-novolac type, or epoxies based on tetrabromobisphenol-A) with for example (meth)acrylic acid. Instead of (meth)acrylic acid also (meth)acrylamide may be used. As used herein, a vinyl ester resin is an oligomer or polymer containing at least one (meth)acrylate functional end group, also known as (meth)acrylate functional resins. This also includes the class of vinyl ester urethane resins (also referred to as urethane(meth)acrylate resins). Preferred vinyl ester resins are methacrylate functional resins including urethane methacrylate resins and resins obtained by reaction of an epoxy oligomer or polymer with methacrylic acid or methacrylamide, preferably with methacrylic acid. Most preferred vinyl ester resins are resins obtained by reaction of an epoxy oligomer or polymer with methacrylic acid.

The vinyl ester resin as is comprised in the vinyl ester resin composition according to the invention preferably has a molecular weight Mn in the range from 500 to 3000 Dalton, more preferably in the range from 500 to 1500. As used herein, the molecular weight of the vinyl ester resin is determined in tetrahydrofurane using gel permeation chromatography according to ISO 13885-1 employing polystyrene standards and appropriate columns designed for the determination of the molecular weights. The vinyl ester resin preferably has an acid value in the range from 0 to 50 mg KOH/g resin and more preferably in the range from 0 to 30 mg KOH/g resin. As used herein, the acid value of the vinyl ester resin is determined titrimetrically according to ISO 2114-2000.

The vinyl ester resin composition according to the invention comprises at least one methacrylate reactive diluent. In case the resin composition comprises a methacrylate functional resin as vinyl ester resin, the resin composition according to the invention comprises, as reactive diluent, a methacrylate containing compound different from the methacrylate functional resin. A methacrylate reactive diluent is a diluent comprising at least one reactive methacrylate group. Non-limiting examples of methacrylate reactive diluents are monofunctional and difunctional methacrylates.

The resin composition according to the invention comprises a reactive diluent. The diluent will be applied, for instance, for lowering of the viscosity of the resin composition in order to make handling thereof more easy. For clarity purpose, a reactive diluent is a diluent that is able to copolymerize with the vinyl ester resin present in the composition according to the invention.

In a preferred embodiment of the present invention, at least 25 wt. % of the methacrylate reactive diluent is a difunctional methacrylate diluent having a molecular weight $M_n$ in the range from 200 to 500. Suitable examples of difunctional reactive diluents having a molecular weight $M_n$ in the range from 200 to 500 are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate and/or tetraethylene glycol dimethacrylate. Preferably, the difunctional methacrylate diluent is selected from 1,4-butanediol di(meth)acrylate, neopentylglycol di(meth)acrylate, PEG200 di(meth)acrylate, triethylene glycol di(meth)acrylate and/or tripropylene glycol di(meth)acrylate. In this preferred embodiment, the resin composition may further comprise a monofunctional methacrylate preferably selected from tetrahydro furfuryl(meth)acrylate, hydroxyl ethyl(meth)acrylate and/or hydroxyl propyl(meth)acrylate.

The resin composition may further comprise another ethylenically unsaturated reactive diluent, for example styrene, α-methylstyrene, N-vinylpyrrolidone and N-vinylcaprolactam. Preferably, the resin composition contains less than 2 wt. % styrene, preferably the resin composition is essentially styrene-free. A low amount of styrene is advantageous as styrene may escape during the preparation and curing, or even during the envisaged long-term use thereof, and causes an undesirable odour, and possibly even also toxic effects.

The resin composition preferably further comprises a co-initiator for the radical curing of the resin composition, in an amount of 0.00001 to 10 wt %. A preferred co-initiator is an amine or a transition metal compound.

The amine co-initiator that may be present in the composition is preferably an aromatic amine and even more preferably a tertiary aromatic amine. Suitable accelerators include N,N-dimethylaniline, N,N-diethylaniline; toluidines and xylidines such as N,N-diisopropanol-para-toluidine; N,N-dimethyl-p-toluidine; N,N-bis(2-hydroxyethyl)xylidine and -toluidine. The amount of amine in the resin composition is generally at least 0.00001 wt. % and preferably at least 0.01 wt. % and more preferably at least 0.1 wt. %. Generally, the amount of amine in the resin composition is at most 10 wt. %, preferably at most 5 wt. %.

Examples of suitable transition metal compounds as co-initiator are compounds of a transition metal with an atomic number of in the range from 22 to 29 or with an atomic number in the range from 38 to 49 or with an atomic number in the range from 57 to 79, such as vanadium, iron, manganese, copper, nickel, molybdenum, tungsten, cobalt, chromium compounds. Preferred transition metals are V, Cu, Co, Mn and Fe.

The resin composition preferably further comprises one or more radical inhibitors. preferably chosen from the group of phenolic compounds, benzoquinones, hydroquinones, catechols, stable radicals and/or phenothiazines. The amount of radical inhibitor as used in the context of the present invention, may, however, vary within rather wide ranges, and may be chosen as a first indication of the gel time as is desired to be achieved.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2, 6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, galvinoxyl, phenothiazine and/or derivatives or combinations of any of these compounds.

Advantageously, the amount of radical inhibitor in the resin composition according to the invention is in the range of from 0.0001 to 10% by weight. More preferably, the amount of inhibitor in the resin composition is in the range of from 0.001 to 1% by weight. The skilled man quite easily can assess, in dependence of the type of inhibitor selected, which amount thereof leads to good results according to the invention.

The resin composition according to the invention comprises an ester of itaconic acid as reactive diluent (herein after referred to as itaconate ester), preferably in an amount of from 5 to 50 wt. %.

The itaconate ester is preferably selected from mono(cyclo)alkyl itaconates, di-(cyclo)alkyl itaconates, diol di-itaconates and triol tri-itaconates. Preferred mono(cyclo)alkyl itaconates are C5-C8 cycloalkyl itaconate and C1-C12 alkyl itaconates, more preferably C1-C6 alkyl itaconates. Preferred di-(cyclo)alkyl itaconates are di-C5-C8 cycloalkyl itaconate, di-C1-C12 alkyl itaconates, more preferably di-C1-C6 alkyl itaconates.

Examples of alkyl itaconates are methyl itaconate, ethyl itaconate, propyl itaconate, isopropyl itaconate, hydroxyethyl itaconate. A preferred example of a cycloalkyl itaconate is cyclohexyl itaconate. Examples of di-alkyl itaconates are dimethyl itaconate, diethyl itaconate, dipropyl itaconate, di-isopropyl itaconate, di-hydroxyethyl itaconate dihexyl itaconate. A preferred example of a di-cycloalkyl itaconate is di-cyclohexyl itaconate. Examples of diol di-itaconates are for instance butanediol di-itaconate, butanediol di-itaconate dimethyl ester, (poly)ethyleneglycol di-itaconate, (poly)ethyleneglycol di-itaconate diethylester, (poly)propyleneglycol di-itaconate, (poly)propyleneglycol di-itaconate diethylester Examples of triol tri-itaconates are for instance trimethylolpropane tri-itaconate, trimethylolpropane. tri-itaconate trimethyl ester and ethoxylated and propoxylated versions thereof.

In a preferred embodiment, the composition according to the present invention comprises a diester of itaconic acid as itaconate ester. In a more preferred embodiment, a diester of itaconic acid is used as itaconate ester The diester of itaconic acid preferably has formula

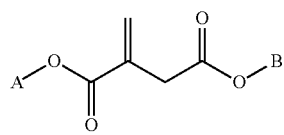

in which A and B may be different or the same and A and/or B being an alkyl group having from 1 to 12 carbon atoms, more preferably from 1 to 6 carbon atoms. Most preferably, dimethylitaconate is used as reactive diluent.

The composition preferably comprises itaconate ester(s) in an amount, relative to the total amount of reactive diluent, of from 5 to 95 wt. %, preferably from 15 to 85 wt. % and more preferably from 20 to 80 wt. %. Preferably the itaconate esters are derived from a non fossil source, such as for example corn.

The weight ratio of methacrylate containing compound (excluding vinyl ester resin) and itaconate esters is preferably in the range of from 10:1 to 1:10, more preferably from 5:1 to 1:5 and even more preferably from 4:1 to 1:4. because within these ratios the advantageous effects of the invention become even more pronounced.

The present invention further relates to a process for radically curing the resin composition according to the invention, wherein the curing is effected by adding an initiator to the resin composition as described above. Preferably, the curing is effected at a temperature in the range of from −20 to +200° C., preferably in the range of from −20 to +100° C., and most preferably in the range of from −10 to +60° C. (so-called cold curing). The initiator is a photoinitiator, a thermal initiator and/or redox initiator.

As meant herein, a photo initiator is capable of initiating curing upon irradiation Photo initiation is understood to be curing using irradiation with light of a suitable wavelength (photo irradiation). This is also referred to as light cure.

A photo-initiating system may consist of a photo initiator as such, or may be a combination of a photo initiator and a sensitizer, or may be a mixture of photo initiators, optionally in combination with one or more sensitizers.

The photo initiating system that can be used in the context of the present invention can be chosen from the large group of photo-initiating systems known to the skilled person. A vast number of suitable photo initiating systems, can be found in, for instance, Volume 3 of "Chemistry and Technology of UV and EB Formulations", $2^{nd}$ Edition, by K. Dietliker and J. V. Crivello (SITA Technology, London; 1998).

The thermal initiator can be selected from azo compounds like for example azo isobutyronitril (AIBN), C—C labile compounds like for example benzopinacole, peroxides, and mixtures thereof. The thermal initiator is preferably an organic peroxide, or a combination of two or more organic peroxides.

The redox initiator is preferably an organic peroxide in combination with at least one of the above mentioned co-initiators. Examples of suitable peroxides are, for instance, hydroperoxides, peroxy carbonates (of the formula —OC(O)OO—), peroxyesters (of the formula —C(O)OO—), diacylperoxides (of the formula —C(O)OOC(O)—), dialkylperoxides (of the formula —OO—), etc.

The present invention further also relates to objects and structural parts prepared from such vinyl ester resin compositions by curing with an initiator as described above. As used herein, structural resin compositions are capable of providing structural parts. Generally such resin compositions are non-aqueous systems. They contain at most 5% by weight of water, mainly resulting from the reactions during resin preparation. As meant herein, structural parts are considered to have a thickness of at least 0.5 mm and appropriate mechanical properties. End segments where the resin compositions according to the present invention can be applied are for example automotive parts, boats, chemical anchoring, roofing, construction, containers, relining, pipes, tanks, flooring, windmill blades.

The invention is now demonstrated by means of a series of examples and comparative examples. All examples are supportive of the scope of claims. The invention, however, is not restricted to the specific embodiments as shown in the examples.

EXAMPLES 1-5 AND COMPARATIVE EXPERIMENT A

Resin formulations were prepared using 550 g Atlac 5808 (commercially available from DSM Composite Resins B.V.), x g Butanediol dimethacrylate, y g polyethylene glycol dimethacrylate, z g dimethylitaconate and 30 g cobalt solution (NL-49P). See Table 1.

Using 2 wt. % Butanox M50 as peroxide, 4 mm castings of these resin formulations were prepared according to the recipe described below. After release of the castings, these were subjected to a post cure of 24 hr 60° C. followed by 24 hr 80° C. Next the castings were subjected to mechanical analysis.

Mechanical properties of the cured objects were determined according to ISO 527-2. The Heat Distortion Temperature (HDT) was measured according to ISO 75-A. The test method for viscosity measurement is according to ISO 3219.

Curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxide as indicated.

TABLE 1

|  | Example 1 | Example 2 | Example 3 | Example 4 | Example 5 | Comparative Experiment A |
| --- | --- | --- | --- | --- | --- | --- |
| Resin (wt %) | 55 | 55 | 55 | 55 | 55 | 55 |
| BDDMA (wt %) | 0 | 10 | 5 | 0 | 10 | 10 |
| PEG200DMA (wt %) | 35 | 20 | 20 | 20 | 0 | 35 |
| DMI (wt %) | 10 | 15 | 20 | 25 | 35 | 0 |
| Solid contents (%) | 55 | 55 | 55 | 55 | 55 | 55 |
| Viscosity (mPa · s) | 448 | 417 | 473 | 487 | 237 | 599 |
| Gel time (min) | 34.4 | 33.9 | 92.6 | 96.2 | 97.5 | 34.1 |
| Peak time (min) | 51.6 | 51.8 | 108 | 114.3 | 126 | 40.8 |
| Peak temperature (° C.) | 104 | 101 | 78 | 71 | 49 | 126 |
| Tensile strength (MPa) | 70.8 | 65 | 77 | 85 | 60 | 52 |
| Tensile modulus (MPa) | 3414 | 3565 | 3680 | 3600 | 3600 | 3128 |
| Elongation at break (%) | 3.15 | 2.34 | 2.7 | 3.63 | 1.84 | 2.06 |
| Flexural strength (MPa) | 113 | 106 | 115 | 125 | 108 | 80 |
| Flexural modulus (MPa) | 3300 | 3490 | 3410 | 3400 | 3660 | 3143 |
| HDT (° C.) | 100 | 105 | 94 | 97 | 94 | 99 |
| Barcol | 47 | 49 | 43 | 50 | 48 | 45 |

These experiments clearly demonstrate that the viscosity of the resin composition can be lowered using itaconate esters whilst maintaining or even improving the mechanical properties of the cured objects. Furthermore in many cases both the tensile strength and modulus (being an indication of stiffness) as well as the elongation at break (being an indication of flexibility) are enhanced. This is surprising as a gain in stiffness is normally offset by a reduction in the flexibility.

The invention claimed is:

1. A resin composition comprising:
   (a) from 30 to 70 wt. % of a vinyl ester resin which is an oligomer or polymer containing at least one (meth)acrylate functional end group, and
   (b) from 30 to 70 wt. % of reactive diluent system comprised of a methacrylate containing compound and an ester of itaconic acid as reactive diluent.

2. The resin composition according to claim 1, wherein the resin composition comprises itaconate ester in an amount of from 5 to 50 wt. %.

3. The resin composition according to claim 1, wherein at least 25 wt. % of the methacrylate-containing compound of the reactive diluent system is a difunctional methacrylate-containing compound having a molecular weight $M_n$ in the range from 200 to 500.

4. The resin composition according to claim 3, wherein the difunctional methacrylate-containing compound is at least one selected from the group consisting of 1,4-butanediol dimethacrylate, neopentylglycol dimethacrylate, PEG200 dimethacrylate, triethylene glycol dimethacrylate and tripropylene glycol dimethacrylate.

5. The resin composition according to claim 1, wherein the vinyl ester resin is obtained by reaction of an epoxy oligomer or polymer with methacrylic acid.

6. The resin composition according to claim 1, wherein the ester of itaconate acid is a diester of itaconic acid.

7. The resin composition according to claim 6, wherein the diester of itaconic acid has a formula:

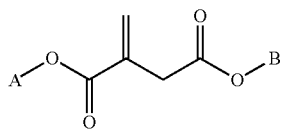

in which A and B may be different or the same and A and/or B are an alkyl group.

8. The resin composition according to claim 7, wherein A and B are the same or different alkyl group having from 1 to 12 carbon atoms.

9. The resin composition according to claim 1, wherein the composition comprises dimethylitaconate.

10. The resin composition according to claim 1, wherein the ester of itaconic acid is derived from a non-fossil source.

11. The resin composition according to claim 1, wherein the ester of itaconic acid is present in an amount, relative to the total amount of the reactive diluent, of from 5 to 95 wt.%.

12. The resin composition according to claim 1, wherein a weight ratio of the methacrylate-containing compound, excluding vinyl ester resin, to the ester of itaconate acid is in a range of from 10:1 to 1:10.

13. The resin composition as in claim 11, wherein the ester of itaconic acid is present in an amount from 15 to 85 wt. %.

14. The resin composition as in claim 11, wherein the ester of itaconic acid is present in an amount from 20 to 80 wt. %.

15. A process for radically curing a resin composition, which comprises radically curing the resin composition according to claim 1 by adding an initiator to the resin composition.

16. A cured object or structural part obtained from the process of claim 15.

17. The cured object or structural part of claim 16, wherein the cured object or structural part is an automotive part, a boat part, a chemical anchor, a roofing part, a construction part, a container, a relining, a pipe, a tank, flooring or a windmill blade.

* * * * *